United States Patent [19]

Dassesse et al.

[11] 3,841,381
[45] Oct. 15, 1974

[54] APPARATUS FOR PRODUCING AND RECOVERING RUBBERY OR STICKY POLYMERS

[75] Inventors: Pierre Dassesse, Jemeppe-Sur-Sambre; Marius Delwiche, Auvelais, both of Belgium

[73] Assignee: Solvey & Cie, Brussels, Belgium

[22] Filed: Apr. 21, 1972

[21] Appl. No.: 246,492

Related U.S. Application Data

[63] Continuation of Ser. No. 874,581, Nov. 6, 1969, abandoned.

[52] U.S. Cl................ 159/2 R, 159/15, 159/18, 159/DIG. 10, 159/DIG. 20, 159/DIG. 25
[51] Int. Cl.......... B01d 1/28, B01d 1/22, B01d 1/26
[58] Field of Search.......... 159/2, D10, D25, 15, 18, 159/44, 47, 213; 203/312 A, 6, 7, 12, 14, 50, 203/51, 53, 85, 90, 95, 96; 202/152, 153, 158, 232, 236; 23/270.5, 272.6; 252/359 D

[56] References Cited
UNITED STATES PATENTS

| | | | |
|---|---|---|---|
| 654,093 | 7/1900 | Emerick | 159/15 X |
| 1,257,854 | 2/1918 | Harris | 159/15 |
| 1,452,253 | 4/1923 | Nevitt | 202/158 X |
| 2,833,750 | 5/1958 | Vickers | 260/85.3 |
| 2,931,433 | 4/1960 | Mertz | 159/44 X |
| 3,074,786 | 1/1963 | Duthie | 23/270.5 X |
| 3,102,062 | 8/1963 | Graham et al. | 159/44 X |
| 3,262,684 | 7/1966 | Smith | 202/158 X |
| 3,585,005 | 6/1971 | Coggan | 23/267 C |

*Primary Examiner*—Jack Sofer
*Attorney, Agent, or Firm*—Robert E. Burns; Emmanuel J. Lobato; Bruce L. Adams

[57] ABSTRACT

Apparatus for producing and recovering rubbery or sticky polymers comprises a reactor for polymerizing one or more monomers in a medium of volatile liquid hydrocarbons, a flashing column to which the polymer with the medium is fed, a recirculation circuit for recycling an aqueous suspension of the polymer through the flashing column, means for withdrawing from the recirculation circuit a portion of the suspension corresponding in polymer content to the polymer fed from the reactor and means for recovering the polymer from the withdrawn portion of the suspension. The flashing column comprises a tower in which deflecting surfaces comprising outwardly diverging cones alternating with inwardly converging frusto-cones are suspended. The polymer with the medium and the recirculated suspension are directed together onto the uppermost deflecting surface and cascade down over the surfaces to a collecting chamber at the bottom of the tower. The hydrocarbon medium is discharged as vapor from the top of the tower. The recirculation circuit includes means for controlling the temperature of the recirculated suspension and for supplying make-up water.

11 Claims, 3 Drawing Figures

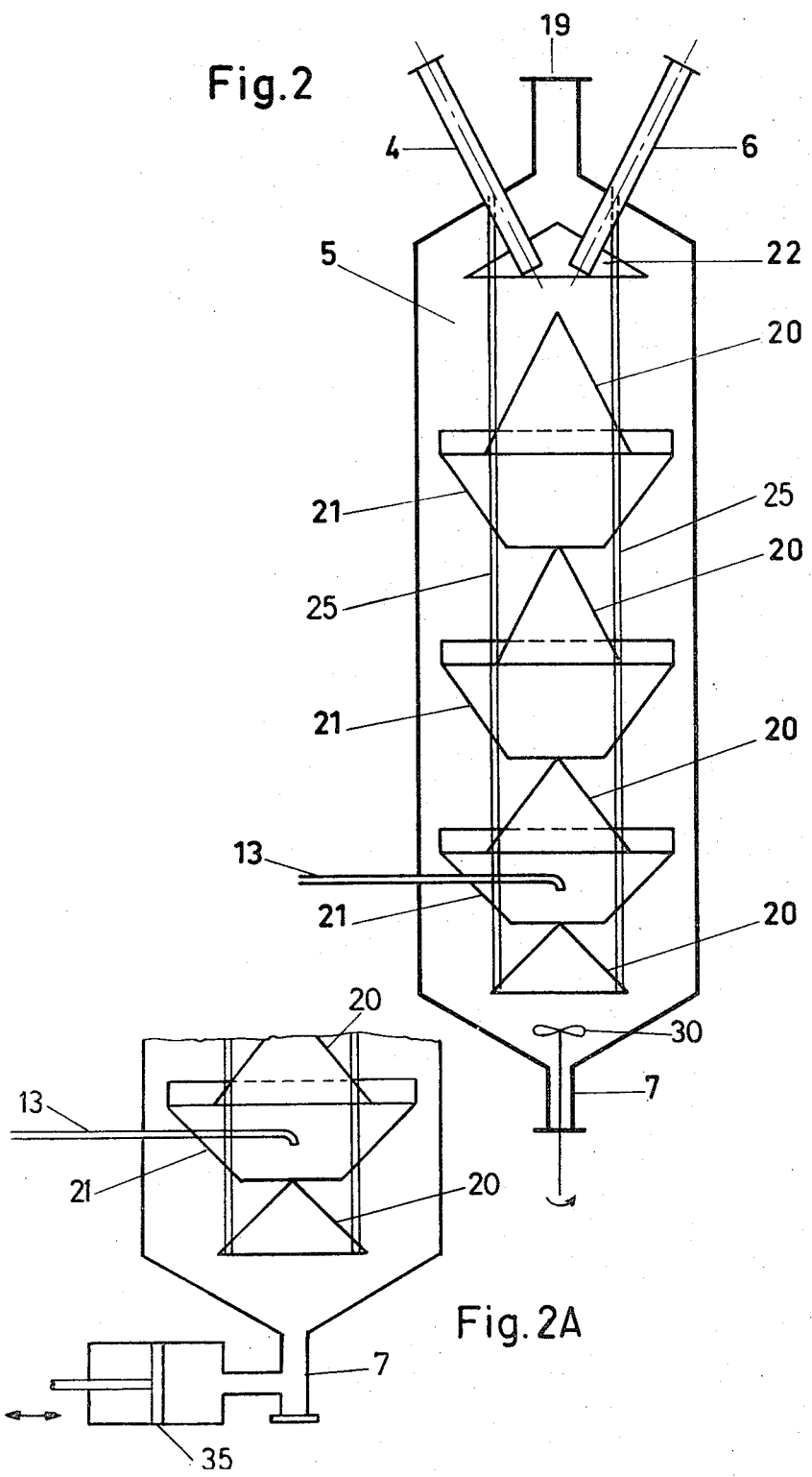

3,841,381

APPARATUS FOR PRODUCING AND RECOVERING RUBBERY OR STICKY POLYMERS

This application is a continuation of our application Ser. No. 874,581 filed Nov. 6, 1969, now abandoned.

BACKGROUND OF THE INVENTION

The present invention is directed to apparatus for the recovery of polyolefins. More particularly, this invention is directed to apparatus in which hot water is used to recover rubbery or sticky polyolefins which have been polymerized in a hydrocarbon medium.

The polymers and copolymers of rubbery olefins which are produced by low-pressure processes are usually obtained in the form of a solution or suspension in an inert solvent in which the unreacted monomers are dissolved. Alternately, these polymers may be obtained as a suspension in the monomers themselves which are kept liquid. It is very difficult to transport these solutions or suspensions since the polymer has a tendency to form agglomerates and to plug the pipe-works. It is generally preferred to treat the polymers directly at the exit of the polymerization reactor in order to separate the polymer from the monomers and from the solvent or diluent when used.

In view of the self-adhesive properties of the polymer at the temperature at which polymerization is carried out, it is practically impossible to separate the same from the reaction medium by reducing the pressure and allowing the solvent to evaporate. Similarly, the separating processes which are carried out by filtration or centrifugation have the serious disadvantage of giving rise to the formation of compact masses which are not easily integrated in a continuous finishing chain. Furthermore, these masses are often polluted with remnants of solid catalyst or liquid medium occlusions which cause difficulties in the later operations.

Many attempts have been made to bring a satisfactory solution to the problem of recovering rubbery polyolefins and separating the same from the monomers and when used, from the solvent or diluent. For example, it has already been proposed to mix the effluent which exits from the polymerization reactor with hot water and superheated steam (reference is made to U.S. Pat. No. 2,726,234 dated Dec. 6, 1952 and assigned to Standard Oil). However, there are serious difficulties when this process is carried out by merely introducing the polymer solution or suspension in a tank which is partially filled with hot water and stirred by steam injection. It has been found that crustings are often produced in the regions of the tank where stirring is less vigorous. Furthermore, when the polymerization medium contains components having relatively high boiling points the separation is unsatisfactory and the aqueous suspension always contains substantial quantities of the high boiling component. Accordingly, this process is not suitable, for example, for the recovery of ethylene-propylene terpolymers containing a diene which has a high boiling point. In this case, the unreacted diene can be separated and recovered only if the aqueous suspension is subsequently submitted to stripping with water vapor under reduced pressure. This may also be the case for the recovery of certain polymers, such as polybutadienes, which have a tendency to absorb the solvents used during the polymerization.

SUMMARY OF THE INVENTION

A process and apparatus have now been found which permit the recovery of rubbery or sticky polyolefins in a single operation, at the exit of the polymerization reactor. These polyolefins are in the form of an aqueous suspension which can easily be treated in a continuous finishing apparatus and the unreacted monomers as well as any extraneous solvent or diluent are thereby completely separated.

The apparatus of this invention comprises a flashing tower provided along its height with surfaces which are successively inclined alternately in opposite directions to cause turbulence and mixing among materials passed through the tower, means for supplying a crude polymer mixture obtained from a polymerization zone to the upper portion of said tower, means for feeding an aqueous suspension of polymers or copolymers to the upper portion of the tower, means to withdraw the aqueous suspension of polymers or copolymers at the bottom of the tower means to recycle part of said removed aqueous suspension to said feeding means and means in the upper portion of the tower for removing volatile hydrocarbons in vapor form.

BRIEF DESCRIPTION OF THE DRAWINGS

FIG. 2 is a schematic cross-section view of the flashing column according to the invention, which column is used preferably in the recovery apparatuses of FIG. 1.

FIG. 2A is a partial schematic cross-section similar to FIG. 2 but showing a modification.

DESCRIPTION OF PREFERRED EMBODIMENTS

Figure 1:
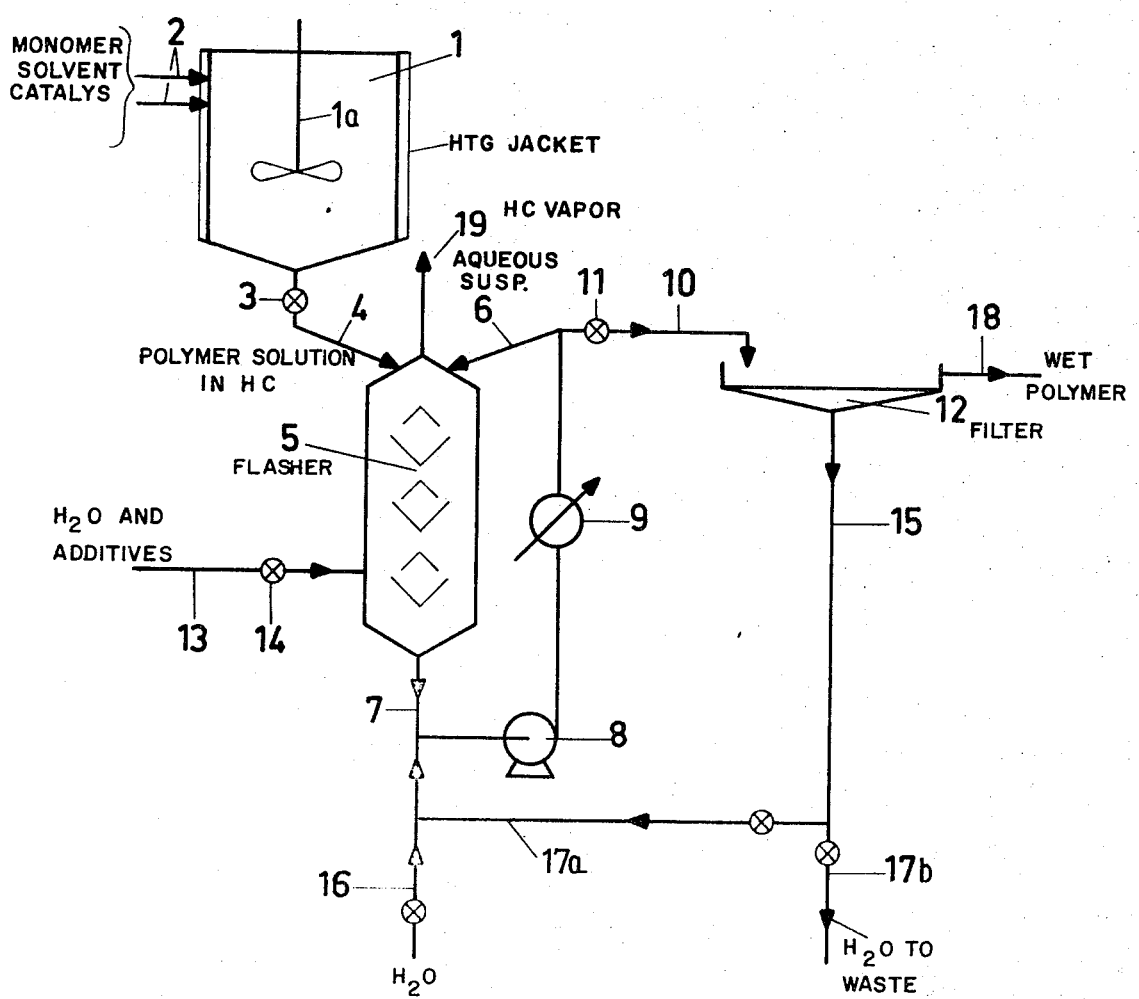
FIG. 1 is a schematic illustration of the combination of apparatuses and piping intended to recover the polymer which exits from the polymerization reactor in carrying out the present invention.

Various rubbery polymers and copolymers derived from olefins which contain one or more double bonds in their molecule may be recovered and purified by the apparatus of the invention. Such polymers and copolymers include those derived from ethylene, propylene, butene-1, isobutene, hexene-1, butadiene, isoprene, hexadiene-1,4, dicyclopentadiene, methylene-and ethylidene-norbornene. The apparatus is especially adapted to recover truly rubbery polymers such as polyisobutenes, polybutadienes, ethylene-alphaolefin copolymers, ethylene-propylene-diene terpolymers, or the polyisoprenes. The apparatus also permits the recovery of these polymers in the form of particles which are not agglomerated and which have an excellent morphology. The apparatus is advantageously applicable to the polymers produced from less volatile monomers such as dicyclopentadiene or the derivatives of norbornene.

The apparatus according to the invention also provides for the easy recovery of nearly all unreacted monomer and facilitates the recycling thereof to the polymerization reactor.

The apparatus according to the invention may also be used to separate polymers which are not really elastomers, but which are sticky such as copolymers of ethylene and higher alpha olefins, for example propylene and butene. It should be noted that these copolymers contain only limited proportions of comonomers with the result that they have the characteristics of a plastic material.

In general, the polymerization of olefins is carried out under moderate pressure in a liquid medium, in the presence of a catalyst which is solid or is dissolved in the polymerization medium. Such catalysts include for example hexavalent chromium oxides deposited on an oxidized solid support, organometallic derivatives of alkali metals, and titanium or vanadium derivatives associated with organometallic compounds. The main component of the liquid medium is either an inert solvent, for example an alkane or a cycloalkane, or one of the monomers. The resulting polymer remains in solution or is dispersed in the form of particles in the liquid medium, depending whether the process is carried out in solution or in suspension.

The polymerization temperatures vary, among other things, according to the nature of the monomers and of the catalyst and according to the type of process (polymerization in solution or in suspension). For example, the temperature of the solution or suspension which exits from the polymerization reactor and which is intended to be treated by the process of the invention can vary within wide limits. For instance, the polyisobutenes which are polymerized in bulk in the presence of Friedel-Crafts catalysts exit from the reactor at a temperature of $-80°C$.. On the other hand, the polyethylene produced in solution under low pressure is removed from the reactor at a temperature higher than $130°C$..

Similarly, the polymerization pressure also varies considerably depending on the processes used. In any case, the pressure should be sufficient to maintain the polymerization medium in a liquid state. As a result, the pressure often reaches values of the order of 30 to 50 kg./cm$^2$. For example, the copolymerization of ethylene and propylene is carried out in suspension in propylene and the latter is maintained liquid at about 40°C. under a pressure of 35 kg./cm.$^2$.

On the other hand, in the expansion column which is used to carry out the invention the pressure is generally about atmospheric in order to promote the vaporization of the monomers and when used of the diluent or solvent. It is therefore often necessary to insert between the reactor and the flashing column, a device adapted to produce pressure losses in order to keep the pressure constant inside the reactor. Another possibility is not to connect the reactor with the flashing column directly and to cause the contents of the reactor to flow into one or more disposed in parallel. In the latter case, it is possible not to inject the polymer solution or suspension continuously and under constant flow into the flashing column. This is particularly the case if the device for reducing the pressure operates under a variable flow and is used to regulate the pressure inside the reactor.

After possibly having stayed in a chamber or after having been passed through a device for reducing the pressure, the polymer solution or suspension is introduced in the upper portion of the flashing column, while an aqueous suspension of the polymer circulating in closed circuit is sprayed therein. For this purpose, part of the aqueous suspension which is at the foot of the column is withdrawn by means of a pump and is recycled to the upper portion of the column. A small portion of the suspension is withdrawn as product which may then be further processed to produce the finished product. The amount of the suspenion withdrawn as product corresponds on the average to the quantity of polymer taken from the reactor and introduced into the column. The withdrawal of a portion of the suspension can be carried out directly at the foot of the column, in a channel located above the pump or, more conveniently, below the latter, and the withdrawal is made continuously or discontinuously. It is also possible, and this has been found advantageous, to automatically modify the flow or the time of withdrawing a portion of the suspension in order that the level of the aqueous suspension at the foot of the column be kept constant. This may also serve to regulate the concentration of the polymer in the aqueous suspension.

The pressure inside the flashing column depends on the nature of the monomers and of the solvent to be recovered. It is also dependent on the temperature inside the expansion column. If the components of the liquid medium are not very volatile, or have a tendency to remain absorbed on the polymer, it is recommended that the pressure be reduced to about 0.05 kg./cm.$^2$. This is particularly the case, for example, for the recovery of ethylene-propylene-diene terpolymers. As a matter of fact, the dienes used are in general relatively high boiling products. It is also the case for the recovery of polybutadienes produced in solution; otherwise it is difficult to recover nearly all the solvent. On the other hand, there is no advantage to unduly lower the pressure when the components of the liquid polymerization medium are easily recovered. The process is then carried out under a pressure lower than 2 kg./cm.$^2$, preferably in the vicinity of atmospheric pressure. The pressure in the flashing column may also vary as the reaction proceeds. For example, when the polymer solution or suspension which exits from the reactor is introduced through a chamber there is a sudden rise of the pressure at the opening of the chamber.

The temperature of the aqueous suspension which is introduced into the upper portion of the flashing column is also dependent on the specific operating conditions. It is selected for example as a function of the nature of the polymer and of its tendency to form agglomerates while hot, and also as a function of the nature of the components of the liquid polymerization medium. The temperature of the aqueous suspension is also responsible for the temperature inside the flashing column. For example, during the recovery of ethylene-alpha-olefin-diene terpolymers, the flashing column is washed internally with an aqueous suspension of the terpolymer and the temperature of the latter is comprised between room temperature i.e., about 20°C. and 100°C. On the other hand, in order to recover the polyolefins produced while in suspension in an alkane or a cycloalkane, the process may be carried out at a temperature between 60° to 90°C. since the main components of the liquid medium are less volatile.

In order to keep the aqueous suspension under ideal temperature conditions, the latter may be cooled down or heated up depending on the particular conditions of each operation. For this purpose, it is possible for example to insert a heat exchange unit in the recycling circuit of the aqueous suspension and to mount the same preferably below the pump. The flow of heating or cooling fluid may advantageously be automatically adjusted according to the temperature of the aqueous suspension as measured immediately before it is reinjected in the flashing column, or alternately at the exit of the column.

The sample of aqueous suspension which is taken from the circuit may be separated after having passed through the heat exchange unit. In this manner, it is possible to feed the polymer finishing operation with an aqueous suspension which is kept at constant temperature.

The temperature of the aqueous suspension may also be adjusted by modifying the temperature of the water which is added in the aqueous suspension circuit to compensate for the quantity of water removed during the sampling. Finally, when the aqueous suspension has to be reheated, this can be carried out by injecting steam either in the recycling circuit, or at the bottom of the expansion column in order to improve the stirring conditions. In some cases, reheating is essential to supply the calories required for the vaporization of the monomer.

The concentration of the polymer in the aqueous suspension varies according to the tendency of the polymer to form agglomerates and to plug the piping. It is however always quite low, for example, generally between 0.1 and 20 percent by weight, in order to provide an efficient flushing of the flashing column. The suspension flow is preferably much greater than the flow of polymer suspension or solution which exits from the reactor. This is particularly the case when the flashing column is irregularly fed with a polymer, for example by means of a chamber device. In general, the flow of the aqueous suspension is 10 to 2,000 times larger that of the polymer suspension or solution which exits from the reactor. In this manner, the temperature and the concentration of the aqueous suspension vary very little as a result of perturbations in the polymer feed. When the polymerization is carried out at high temperature, there is a possibility of hot spot formations in the flashing column. This risk is eliminated when the flow of aqueous suspension is large compared to the very hot solution or suspension which exits from the reactor.

The aqueous polymer suspension moves inside the flashing column while forming a series of successive cascades or falls from the point of injection, at the upper portion of the column, to the foot of the column, where the suspension is taken over by the pump. In order that the washing operation inside the column be as efficient as possible, it is desirable that the height of each of these falls be relatively low (for example 20 to 60 cm). In this manner, the aqueous suspension is constantly stirred and the exchange surface between the suspension and the vapor phase is continuously being replenished. The bouncing and turbulence of the aqueous suspension as it falls in a series of cascades has been found to aid in the separation of the minor portion of volatile constituents which did not vaporize initially, i.e., where the crude polymer moisture first contacted the flowing aqueous suspension. It has also been found that the turbulence is important in avoiding the formation of polymer aggregates and to provide polymer particles with desirable physical characteristics.

A specific embodiment of the invention comprises the division of the aqueous suspension into a plurality of jets in the upper portion of the column. This way of operating improves the possibility of heat and material exchanges.

The discharge in successive falls can easily be carried out by causing the aqueous suspension jet or jets to bounce over baffles which are inclined sometimes in one direction and sometimes in another. The shape and the attachment of these baffles should be such that there are no dead zones inside the coolumn wherein flushing with the aqueous suspension alone would be insufficient. The inclination of the baffles may vary along the height of the column, those less vertically inclined being mounted in the upper portion of the column, in a location where the kinetic energy acquired by the aqueous suspension is the weakest.

Though it is not essential in the majority of cases, the inclined surfaces which are adapted to cause the flow in successive falls can be actuated by continuous or intermittent movement intended to disrupt the agglomerates which could have been formed thereon.

The aqueous suspension and the crude polymer suspension or solution which exits from the polymerizable reactor are preferably introduced in the upper portion of the column in order that they meet at a point as close as possible to the point of introduction of the crude polymer suspension or solution. As soon as it arrives in the flashing column, the liquid polymerization medium is volatilized and the polymer concentration increases very rapidly. This may produce a solidification of the polymer which may be prevented by directly mixing the aqueous suspension with the polymerization medium, preferably by producing a collision between the two liquid jets. It is then possible to introduce both the aqueous solution and the effluent which exits from the reactor by means of concentric pipes to assure an intimate and immediate mixture of the fluids. By operating in such a manner, relatively fine polymer particles are formed which, in view of the high state of dilution and the intense stirring of the aqueous suspension, have no tendency to agglomerate.

The foot of the column is filled with the aqueous suspension and is used as a reservoir for feeding the recycling pump. The quantity of aqueous suspension should not be too great, otherwise, the stirring action created by the fall of the aqueous suspension and the withdrawal carried out by the pump would be insufficient to prevent decantation and agglomeration of the polymer particles. On the other hand, stirring can be improved by using a blade-type rotary device or by connecting a piston pulsation producing device. Steps should be taken to prevent the level of the aqueous suspension from dropping too low to prevent the introduction of a vapor phase into the pump.

The level of the aqueous suspension at the foot of the column may be automatically adjusted advantageously, for example, by regulating the quantity of suspension which has been withdrawn and which is not recycled or alternately by varying the amount of water introduced into the circuit to compensate for the amount which has been withdrawn along with the polymer. This second mode of operation is especially useful since it permits modifications of the quantity of aqueous suspension withdrawn and which is not recycled to assure a constant polymer concentration in the aqueous suspension.

At the exit of the flashing column, the aqueous suspension is again taken up by means of a pump the suction opening of which is preferably located below the level of the aqueous suspension at the bottom of the column so as to prevent any risk of failing. The pump may be of any known type. In view of the nature of the medium to be carried, it is preferred to use an open wheel centrifugal pump in which the packing is flushed with a flow of pure water under pressure.

It is often necessary to incorporate certain additives in the polyolefins, for example, agents intended to increase their resistance to aging. It is also desirable to treat some elastomeric polymers with wetting agents, such as long chain fatty acids and derivatives thereof, to lower their tendency to solidify under their own weight when stored away. These additives are preferably introduced in fluid form in the flashing column preferably at a point where agitation is very vigorous. The additives which are water-soluble may be dissolved in water which is introduced in the aqueous suspension circuit. For the additives which are water-insoluble, a solution thereof in one of the monomers or in the solvent or polymerization diluent may be used.

The flashing column also contains a vapor phase which comprises water vapor, one or more monomers, when used, a solvent or diluent as well as other volatile substances which are present in the polymerization medium such as gaseous chain transfer agents. The vapor phase is preferably removed at the top of the column since the major portion of the components of the polymerization medium are completely volatilized as soon as they enter the column and they are preferably removed immediately in order to prevent the displacement of a substantial flow of gas inside the column. The device for removing the vapor phase may be a deflector which is used to prevent the droplets from being carried away.

The vapor phase which leaves the flashing column is generally condensed, then fractionated in order to recover the various components separately. The monomers, diluent or solvent, gaseous chain transfer agents, etc. are recycled to the polymerization in many cases after having been purified to completely remove water therefrom.

When devising the flashing column, provision should be made for the possible plugging of the piping in which case sudden rises in pressure can occur inside the column. Therefore, it is advisable to provide a safety valve or a breaking disc at a point where the chances of crusting and damage to the security device are reduced to the minimum. This device is advantageously mounted on the pipe used to evacuate the vapor phase.

A fraction of the aqueous suspension is withdrawn and is not recycled in order to send towards the finishing stage a quantity of polymer which corresponds to the average production of the reactor. The quantity of water which is removed at the same time as the polymer should be replaced by a corresponding inflow. This inflow may be made at any point along the aqueous suspension circuit. If, in the flashing column, there are zones where crusting must not take place, the inflow of water may be made particularly in these zones. The quantity of water which is introduced may also be used, as stated above, to regulate the level of the aqueous suspension at the bottom of the column or the polymer concentration in the suspension. It is also possible to adjust the temperature of the aqueous suspension by varying the temperature of the water added. Finally water may be introduced in the form of vapor anywhere along the aqueous suspension circuit especially when it is deemed advisable to bring a great number of calories to the suspension.

The fraction of aqueous suspension which is withdrawn and is removed from the aqueous suspension circuit is then treated in order to separate the polymer by any known method of separating solids, such as by filtration, decantation, centrifugation, etc. The polymer is then dried and treated in the finishing operation. Water which is recovered in the separating stage may advantageously be reintroduced into the suspension circuit in order to compensate for the amount withdrawn with the polymer. Recycling is especially interesting if the suspension must be reheated or if it contains an additive intended to be incorporated in the polymer. Alternatively, before being recycled, water may be purified by removing certain substances such as the catalytic residues which can accumulate in the aqueous suspension.

The scope of the invention will be better understood with reference to the description which follows of a practical embodiment. This description is given as illustration of the invention and refers to FIGS. 1 and 2.

According to FIG. 1, the polymerization reactor 1 is supplied with monomers, diluent or solvent, catalysts, chain transfer agents, etc., either mixed together or separately through one or more pipes 2. The tank-type reactor 1 is provided with a blade stirrer 1a, and a double jacket not represented, which is used to add or remove heat. The polymerization medium is kept at constant pressure and temperature by suitably regulating the operating conditions. Polymerization is carried out continuously and the polymer which is produced is removed in the form of a solution or suspension through the bottom of the tank. The evacuation pipe is provided with a valve 3 intended to produce a sufficient loss of pressure between the reactor and the flashing column. By varying the opening of the valve, it is possible to adjust the pressure inside the polymerization reactor. The polymer solution or suspension is introduced into the upper portion of the flashing column 5 by means of the pipe 4.

It is also possible to combine the effluents from a plurality of reactors into a single pipe in order to treat the same in a single flashing column.

On the other hand, the effluent which exits from a single reactor may also be split in order to treat the same in a plurality of flashing columns and this assures a higher security of operation.

The flashing column 5 is supplied at the upper portion thereof with an aqueous suspension of recycle polymer through the pipe 6. At the bottom of the column, the polymer enriched aqueous suspension is removed by the pipe 7. The aqueous suspension then passes through centrifugal pump 8 and heat exchanger 9. The pump 8 operates continuously and under a constant flow for a given production. The flow of heating or cooling fluid in the exchanger 9 may be adjusted depending on the temperature of the aqueous suspension which is fed into or exits from the flashing column. In the first instance, the fraction of aqueous suspension sampled through the pipe 10 is always at the same temperature. The amount withdrawn is adjusted by the degree of opening of the valve 11. This opening may for example be adjusted depending on the level of the aqueous suspension at the bottom of the flashing column or in order to keep a constant concentration of the polymer in the suspension. The suspension which is withdrawn is then treated on a filter 12.

There is provided a device for injecting additives in fluid form in the flashing column. This injection is carried out by pipe 13 and is adjusted by the valve 14. In order that the losses of additives be as low as possible, the water used for filtration may be recycled via pipe 15 towards the aqueous suspension circuit upstream of the pump after having possibly received a supplementary inflow of water by the pipe 16. Provisions are also made for the removal of the water of filtration and returning it, in part or entirely, to the pump 8 by pipe 17a or directing it towards the sewers by pipe 17b. The still wet polymer is removed from the filter 12 at 18 and is then directed towards the drying and finishing stages. The vapor phase which for example contains the monomers escapes at the upper portion of the flashing tower 15 through the pipe 19.

FIG. 2 represents a cross-section view of the flashing tower 5. The inclined surfaces on which the aqueous suspension bounces in a plurality of falls are alternately made of hollow sheet-metal cones 20 and truncated cones 21 which are represented in cross-section. The polymer solution or suspension which exits from the reactor is introduced to the column 5 by way of pipe 4. The aqueous suspension enters the column 5 by means of pipe 6. The axes of the two pipes 4 and 6 intersect at the top of the uppermost deflecting cone 20 and are tangential to the lateral surface thereof along an element of the cone. The upper portion or vertex of the first cone is therefore located at the junction of the two liquid jets. The aqueous suspension is distributed over the cone and successively falls inside a truncated cone and then outside a cone. The inclination of the lateral surface is steeper and steeper with respect to the vertical as the aqueous suspension acquires a higher kinetic energy. The top of the flsshing column is also provided with a conical deflector 22 which is intended to prevent drops from being carried along with the vapor phase in the pipe 19 through which the latter is removed. Additives may be introduced through pipe 13 on to the top of the last cone where agitation is stronger. Under ideal operating conditions, the level of the aqueous suspension at the bottom of the flashing column, should not be higher than the base of the last cone. The aqueous suspension is removed by the pipe 7. The deflector 22, cones 20 and truncated cones 21 are suspended at the ceiling of the column by three vertical members 25 disposed at 120° in order to completely free the wall and the bottom of the column. Only two of the members 25 appear in the drawing. The possibilities of crusting of the polymer are thus reduced to a minimum.

A blade-type rotary device 30 is shown provided for stirring the liquid in the lower portion of the tower. Alternatively, as illustrated in FIG. 2A, a reciprocating piston device 35 produces pulsations in the liquid.

The following examples further illustrate the best mode currently contemplated for carrying out the present invention but they must not be considered as limiting the invention in any manner.

EXAMPLE 1

The apparatus of the invention is applied to the recovery of a terpolymer of ethylene, propylene and hexadiene.

The polymerization is carried out in a tank-type reactor which has a capacity of 300 liters. The reaction is carried out continuously while the polymer is suspended in the monomers which are kept liquid. There are continuously added 40 liters per hour (40 e./p.h.) of liquid propylene, 2 l./p.h. of hexadiene-1,4-trans and 3 kg./h. of ethylene. The catalyst used is solid and is made of halogenated derivatives of titanium and vanadium which are chemically bounded to a polymer having —OH groups, and of a trialkyl derivative of aluminum. The polymerization is carried out at a pressure of 35 kg./cm.$^2$ and a temperature of 40°C..

The terpolymer suspension is removed from the reactor by means of a chamber. There are produced 4 kg./h. of a terpolymer consisting of ethylene, propylene, and hexadiene in the molar ratios respectively of 65 percent, 33 percent and 2 percent. The terpolymer suspension in the liquid monomers is introduced in the upper portion of a flashing column having 40 cm diameter and 150 cm height. The shape of the column is identical to the one represented in FIG. 2. The flashing column is washed continuously with an aqueous suspension containing 2 percent by weight of terpolymer. The suspension is continuously recycled by means of a pump having a capacity of about 10,000 l./h.. At the pump outlet, the aqueous suspension is passed through an exchanger in which the temperature of the suspension is raised to 40°C.. The absolute pressure in the flashing column varies between 1.2 and 1.6 kg./cm.$^2$ during the periods wherein the chamber is opened or closed.

200 l./h. of the aqueous suspension are withdrawn at the output of the heat exchanger and filtration is carried out to recover the terpolymer. The latter is in the form of well-shaped particles which are easily handled. Water is drained towards the sewer.

The terpolymer is treated with a pre-stabilizer which is sold under the name MONTACLERE by Monsanto. A solution of the above pre-stabilizer in trans-1,4-hexadiene is introduced inside the flashing column by means of a pipe having a small diameter. The addition is carried out at a rate of 8 g. of active product per hour. Hexadiene which is used to dissolve the pre-stabilizer is recovered along with the excess amount which has not reacted during the polymerization.

In the upper portion of the flashing column, a vapor phase is recovered in which the approximate hourly flow of each of the components is the following: 18 kg. in the case of propylene, 1 kg. in the case of ethylene and 1 kg. in the case of hexadiene. The vapor phase contains practically no water. The monomers are separated and purified before being recycled towards the polymerization reactor.

Pure water is introduced at the rate of 200 liters per hour in the recycling circuit in order to make up for the sampling which is carried out to separate the terpolymer.

The apparatus operates without problems during long periods of time. The terpolymer produced is in a form which is very easily handled and the above apparatus permits a good distribution of the pre-stabilizer. Hexadiene is recovered almost quantitatively.

EXAMPLE 2

The apparatus of the invention is applied to the recovery of a copolymer of ethylene and butene-1.

Polymerization is carried out in a tank-type reactor having a capacity of 200 liters. The reaction is carried out continuously while the polymer is suspended in liquid hexane. There are added continuously 15 kg./h. of hexane, 4 kg./h. of ethylene, 1 kg./h. of butene-1 and 1 g./h. of hydrogen. Hydrogen is used as chain transfer agent. The catalyst is a solid material and is derived from a halogenated derivative of titanium which is chemically bounded on an oxidized solid support, and from a trialkyl derivative of aluminum. Polymerization is carried out at a pressure of 30 kg./cm.$^2$ and a temperature of 70°C..

The copolymer suspension is removed from the reactor by means of a chamber. The production amounts to 3.5 kg./h. of a copolymer in which the molar percentages are the following:

| | |
|---|---|
| ethylene | 96.5% |
| butene-1 | 3.5% |

The copolymer suspension is introduced in the upper portion of a flashing column having a diameter of 40 cm and a height of 150 cm. The shape of the column is identical to the one represented in FIG. 2. The flashing column is continuously washed with an aqueous suspension containing 3.5 percent by weight of copolymer. The suspension is continuously recycled by means of a pump having a flow capacity of about 10,000 l./h.. At the outlet of the pump, the aqueous suspension is passed through an exchanger in which the temperature of the suspension is raised to 80°C.. The absolute pressure in the flashing column varies between 1.8 and 1.9 kg./cm.$^2$ during the periods wherein the chamber opened or closed.

100 l./h. of the aqueous suspension are withdrawn at the exit of the heat exchanger and the suspension is filtered to recover the copolymer. The latter has a melt index of 0.4 and a density of 0.920. The water which has been filtrated is evacuated towards the sewer.

In the upper portion of the flashing column, there is recovered a vapor phase in which the hourly flow of each of the main components is approximately the following:

| | |
|---|---|
| hexane | 15 kg. |
| ethylene | 0.75 kg. |
| butene-1 | 0.75 kg. |
| water | 2 kg. |

The monomers are separated and purified before being recycled towards the polymerization reactor.

Pure water is introduced at the rate of 100 liters per hour in the recycling circuit in order to make up for the withdrawn portion which is carried out in order to separate the copolymer.

The apparatus operates without any difficulties during long periods of time. It permits the recovery of the copolymer in the form of non-agglomerated particles which are very easily handled.

What we claim and desire to secure by Letters Patent is:

1. Apparatus for producing and recovering rubbery or sticky polymers comprising a reactor for polymerizing one or more monomers in a medium of volatile liquid hydrocarbon, and a recovery system comprising a flashing column comprising a tower provided along a portion only of its height with superposed diverging deflecting surfaces alternating with converging deflecting surfaces in the general direction of flow, means for conducting said polymers with said medium from said reactor to the top of said tower and directing it onto the uppermost of said deflecting surfaces, means for supplying water to said tower to form an aqueous suspension of said polymer, said tower having at its lower end below the lowermost deflecting surface a chamber for collecting said suspension, a recirculation circuit including pump means for withdrawing said aqueous suspension from said chamber and conduit means for conducting it to the top of said tower and directing it onto the uppermost of said deflecting surfaces together with said polymer in said medium to direct said suspension and polymer in a cascade down over successive deflecting surfaces to said chamber at the lower end of said tower, means for withdrawing from said system a selected amount of said suspension corresponding in polymer content to the polymer conducted to said tower from said reactor, means for processing the withdrawn suspension to remove separately the polymer and water therefrom, means for introducing into said system make-up water in an amount corresponding to the amount of water withdrawn and means for discharging vapor of said medium from the top of the tower.

2. Apparatus according to claim 1, in which said recirculation circuit includes heat exchanger means for controlling the temperature of the recirculated suspension.

3. Apparatus according to claim 1, in which said reactor operates at superatmospheric pressure and in which said means for conducting said polymer with said medium from the reactor to the flashing column includes means for reducing the pressure to maintain approximately atmospheric pressure in said flashing column.

4. Apparatus according to claim 1, further comprising means for introducing additives into said flashing column.

5. Apparatus according to claim 1, in which said means for discharging vapor of said medium includes a discharge opening at the top of said tower, and in which a conical deflector is located below said opening and above the uppermost of said deflecting surfaces to prevent discharge of droplets of liquid through said opening.

6. Apparatus according to claim 1, further comprising agitating means in said chamber at the lower end of said tower below the lowermost of said deflecting surfaces.

7. Apparatus according to claim 1, further comprising pulsating producing means at the bottom of said tower for producing pulsations in said suspension collected in said chamber.

8. Apparatus according to claim 1, in which said processing means comprises filter means for separating said polymer from the water of said suspension and in which said means for introducing make-up water comprises means for conducting water from said filter means to said recirculation circuit.

9. Apparatus according to claim 8, in which said means for introducing make-up water includes means for selectively introducing into said recirculation circuit water in addition to that from said filter.

10. Apparatus according to claim 1, in which said diverging deflecting surfaces comprise cones having their apices up and said converging deflecting surfaces comprise truncated cones converging downwardly.

11. Apparatus according to claim 10 comprising means for suspending said cones and truncated cones from the top of said tower, the peripheries of said cones and truncated cones being spaced inwardly from side walls of said tower.

* * * * *